United States Patent
Kim et al.

(10) Patent No.: US 8,358,601 B2
(45) Date of Patent: Jan. 22, 2013

(54) MULTI-ANTENNA RADIO CHANNEL MEASUREMENT SYSTEM AND METHOD WHICH GENERATES TIME DIVISION DUPLEX TIMING SIGNAL AND MEASURES TWO-WAY RADIO CHANNEL

(75) Inventors: Myung Don Kim, Daejeon (KR); Jae Joon Park, Daejeon (KR); Won Sop Kim, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 330 days.

(21) Appl. No.: 12/746,362

(22) PCT Filed: Sep. 3, 2008

(86) PCT No.: PCT/KR2008/005176
§ 371 (c)(1),
(2), (4) Date: Jun. 4, 2010

(87) PCT Pub. No.: WO2009/075458
PCT Pub. Date: Jun. 18, 2009

(65) Prior Publication Data
US 2010/0260078 A1    Oct. 14, 2010

(30) Foreign Application Priority Data

Dec. 10, 2007  (KR) .................. 10-2007-0127384

(51) Int. Cl.
*H04J 3/00* (2006.01)
*H04W 40/00* (2009.01)
(52) U.S. Cl. ..................................... 370/280; 455/456.5
(58) Field of Classification Search .................. None
See application file for complete search history.

(56) References Cited

U.S. PATENT DOCUMENTS
(Continued)

FOREIGN PATENT DOCUMENTS

| KR | 10-2007-0098853 A | 10/2007 |
|---|---|---|
| KR | 10-0778345 B1 | 11/2007 |
| WO | 2006/062994 A2 | 6/2006 |
| WO | 2007/066949 A2 | 6/2007 |

OTHER PUBLICATIONS

International Search Report mailed on Mar. 10, 2009 in International Application No. PCT/KR2008/005176.

(Continued)

*Primary Examiner* — John Blanton
(74) *Attorney, Agent, or Firm* — Kile Park Goekjian Reed & McManus PLLC

(57) ABSTRACT

The present invention relates to a multi-antenna radio channel measurement system and method which generates a Time Division Duplex (TDD) timing signal and measures a two-way radio channel. The multi-antenna radio channel measurement system which measures a probing signal for measuring a radio channel, the multi-antenna radio channel measurement system including: a baseband unit alternately transmits the probing signal for measurement and receives the received channel signal to be measured based on a TDD synchronization time; a synchronization unit which obtains time synchronization with the other radio channel measurement system, generates a transmission/reception synchronization signal, and provides the transmission/reception synchronization signal to the baseband unit; a transceiver unit which up converts the probing signal for measurement and down converts the received channel signal; and a radio frequency (RF) front-end unit which switches suitable antennas according to a timing control signal of the baseband unit.

9 Claims, 7 Drawing Sheets

U.S. PATENT DOCUMENTS

| | | | |
|---|---|---|---|
| 6,470,057 B1 * | 10/2002 | Hui et al. | 375/294 |
| 6,917,597 B1 | 7/2005 | Schmidl et al. | |
| 2006/0019679 A1 * | 1/2006 | Rappaport et al. | 455/456.5 |
| 2007/0092012 A1 | 4/2007 | Wilhelmsson et al. | |
| 2008/0125047 A1 * | 5/2008 | Li et al. | 455/63.1 |

OTHER PUBLICATIONS

Written Opinion of the International Searching Authority mailed on Mar. 10, 2009 in International Application No. PCT/KR2008/005176.

* cited by examiner

MULTI-ANTENNA RADIO CHANNEL MEASUREMENT SYSTEM AND METHOD WHICH GENERATES TIME DIVISION DUPLEX TIMING SIGNAL AND MEASURES TWO-WAY RADIO CHANNEL

TECHNICAL FIELD

The present invention relates to a multi-antenna radio channel measurement system and method which generates a Time Division Duplex (TDD) timing signal and measures a two-way radio channel. More particularly, the present invention relates to a multi-antenna radio channel measurement system and method which may simultaneously transmit/receive data, and measure a radio channel by synchronizing with two apparatuses for measuring the radio channel using a TDD timing signal.

This work was supported by the IT R&D program of MIC/IITA. [2005-S-001-03, Development of Wireless Vector Channel Model for next generation mobile communication]

BACKGROUND ART

A next-generation mobile communication system requires a technology providing a high-speed data transmission rate to improve a voice service and low-speed data service in a conventional art and provide a variety of high-speed multimedia services. Various technologies such as broadband frequency use and a method using a multiple antenna have been conducted to achieve a high-speed data transmission rate. A system using a multiple antenna is sensitive to features of radio channel in comparison with a single-antenna system in a conventional art. Accordingly, when designing a multi-antenna system, features of radio channel are required to be accurately ascertained. A next-generation radio communication system using the above-described multi-antenna is expected to be generally used in a city where electric waves are affected by buildings, trees, and the like. Also, a next-generation radio communication system using the above-described multi-antenna is expected to be widely used for wireless high-speed data communication.

In general, a multi-antenna radio channel measurement system, referred to as a channel sounder in a conventional art, is one-way measurement system, and is divided into a transmission system and a receiving system. A one-way channel sounder in a conventional art measures a radio channel in a city or an area where traffic is complex such as an urban macro or urban micro, while moving according to a specific route using a moving vehicle. In this instance, to measure a radio channel, multi-antennas for transmission and transmission system are installed in a base station or steel tower relatively higher than surrounding buildings, and multi-antennas for receiving and receiving system are installed in the moving vehicle. Through the measurement method described above, a radio channel emitted in a base station, that is, a change of downlink radio channel in various environments according to a route of a moving vehicle is measured. As opposed to the configuration above, a receiving system and multi-antennas for receiving may be installed in a base station, and a transmission system and multi-antennas for transmission may be installed in a moving vehicle. Through this, a moving vehicle emits an electric wave for measurement while moving based on a specific route, and a base station collects measurement data of an uplink radio channel emitted by a moving vehicle.

However, a one-way radio channel measurement system and method of operating the same in a conventional art is required to sequentially operate a downlink and uplink in order to measure a number of routes in a same measurement area and in a variety of environments. For this, a measurement apparatus and antenna are required to be installed in a base station and moving vehicle, respectively, and a downlink measurement is to be performed. After the downlink measurement is complete, the measurement apparatus and antenna of each of the base station and moving vehicle are changed and installed, and an uplink measurement is to be performed. A single measurement path in the same area and environment is measured twice in the system and method described above, which is inefficient and time-consuming, increases costs and wastes human resources.

Also, features of radio channel to be measured frequently change depending on an environment. In particular, a speed of moving vehicle when measuring an uplink is not identical to a speed of moving vehicle when measuring a downlink, and thus these channels may not be measured in the same environment. Also, radio channel measurement data of each of the uplink and downlink measured as described above is not measured at the same time, same measurement point, and surrounding environment, although the same path is measured. Accordingly, collected channel data to estimate correlation between data of each of the uplink and downlink may not be accurate.

Thus, a two-way radio channel measurement system is established, and a method and system to simultaneously measure an uplink and downlink in a same environment and condition when measuring a radio channel is required. Also, a technical control method and operation method to embody the two-way radio channel measurement system is required.

DISCLOSURE

Technical Problem

The present invention provides a multi-antenna radio channel measurement system and method which generates a Time Division Duplex (TDD) timing signal and measures a two-way radio channel.

The present invention also provides a multi-antenna radio channel measurement system and method which generates a TDD timing signal to enable a two-way radio channel to be measured.

The present invention also provides a multi-antenna radio channel measurement system and method which may transmit and receive data simultaneously, and measure a two-way radio channel by synchronizing with two apparatuses for measuring the two-way radio channel using a TDD timing signal.

Technical Solution

According to an aspect of the present invention, there is provided a multi-antenna radio channel measurement system which measures a probing signal for measuring a radio channel, the multi-antenna radio channel measurement system including: a baseband unit which alternately transmits the probing signal for measurement and receives the received channel signal to be measured based on a Time Division Duplex (TDD) synchronization time; a synchronization unit which obtains time synchronization with the other radio channel measurement system, generates a transmission/reception synchronization signal, and provides the transmission/reception synchronization signal to the baseband unit; a transceiver unit which up converts the probing signal for measurement and down converts the received channel signal;

and a radio frequency (RF) front-end unit which switches suitable antennas according to a timing control signal of the baseband unit.

According to another aspect of the present invention, there is provided a method of measuring a radio channel in a multi-antenna radio channel measurement system, the method including: setting a frequency band and bandwidth to be measured in a TDD mode; downloading and storing a predetermined probing signal for measurement; receiving and setting a predetermined synchronization parameter; setting a transmission and reception timing control signal to synchronize with another radio channel measurement system for a bidirectional measurement; and transmitting the probing signal for measurement according to the timing control signal, and receiving and storing a received channel signal.

MODE FOR INVENTION

Hereinafter, embodiments of the present invention are described in detail by referring to the figures.

The present invention relates to a multi-antenna radio channel measurement system and method which may simultaneously transmit/receive data, and measure a radio channel by synchronizing with two apparatuses for measuring the radio channel using a TDD timing signal.

Figure 1:
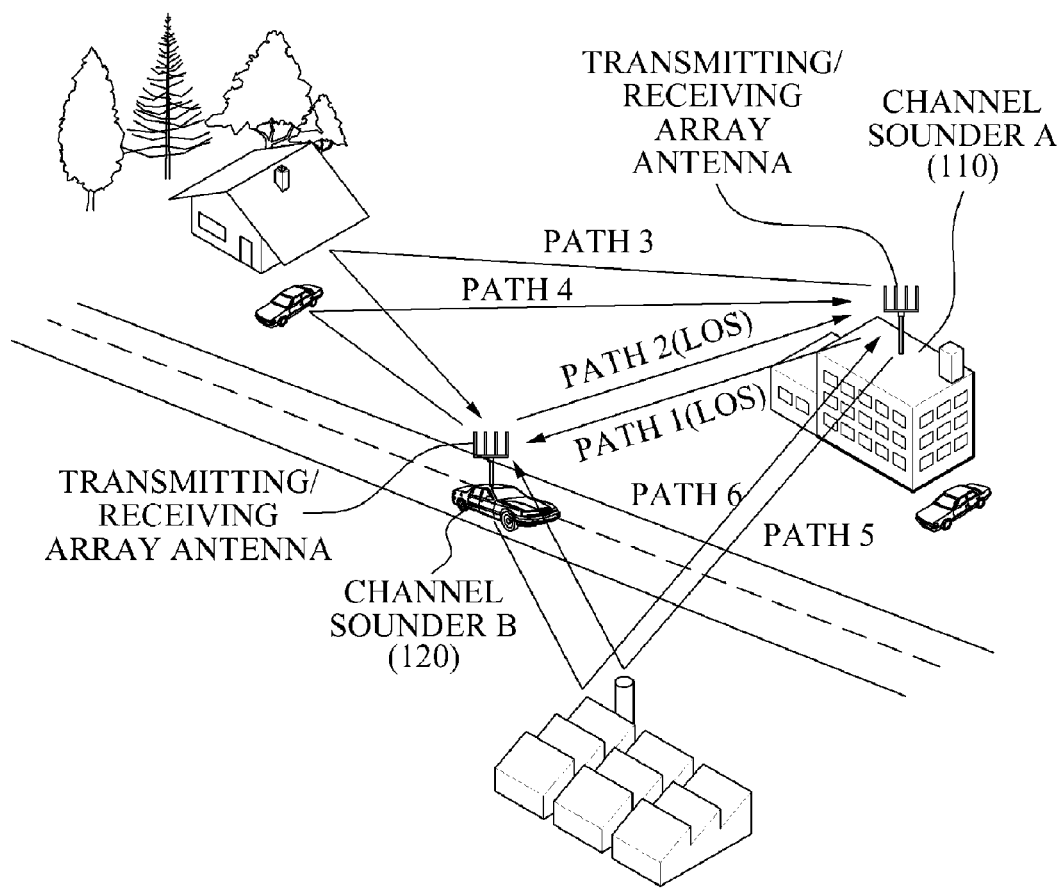
FIG. 1 is a diagram illustrating a configuration of a multi-antenna radio channel measurement system which measures a two-way radio channel according to an embodiment of the present invention.

FIG. 1 is a diagram illustrating a configuration of a multi-antenna radio channel measurement system which measures a two-way radio channel according to an embodiment of the present invention. By referring to FIG. 1, an example where a radio channel may be measured and data may be acquired while a vehicle 120 moves based on a predetermined route by installing a two-way radio channel measurement system in a base station 110 and the vehicle 120 is illustrated. Here, the two-way radio channel measurement system where a transmission function and receiving function are combined is referred to as a channel sounder. Paths of electric waves transmitted/received in each of the radio channel measurement systems 110 and 120 includes an uplink path 2, uplink path 4, and uplink path 6, and a downlink path 1, downlink path 3, and downlink path 5. Since the paths may be simultaneously measured at a same measurement point in time, vehicle speed, and environment, the two-way radio channel may be simultaneously measured.

Figure 2:
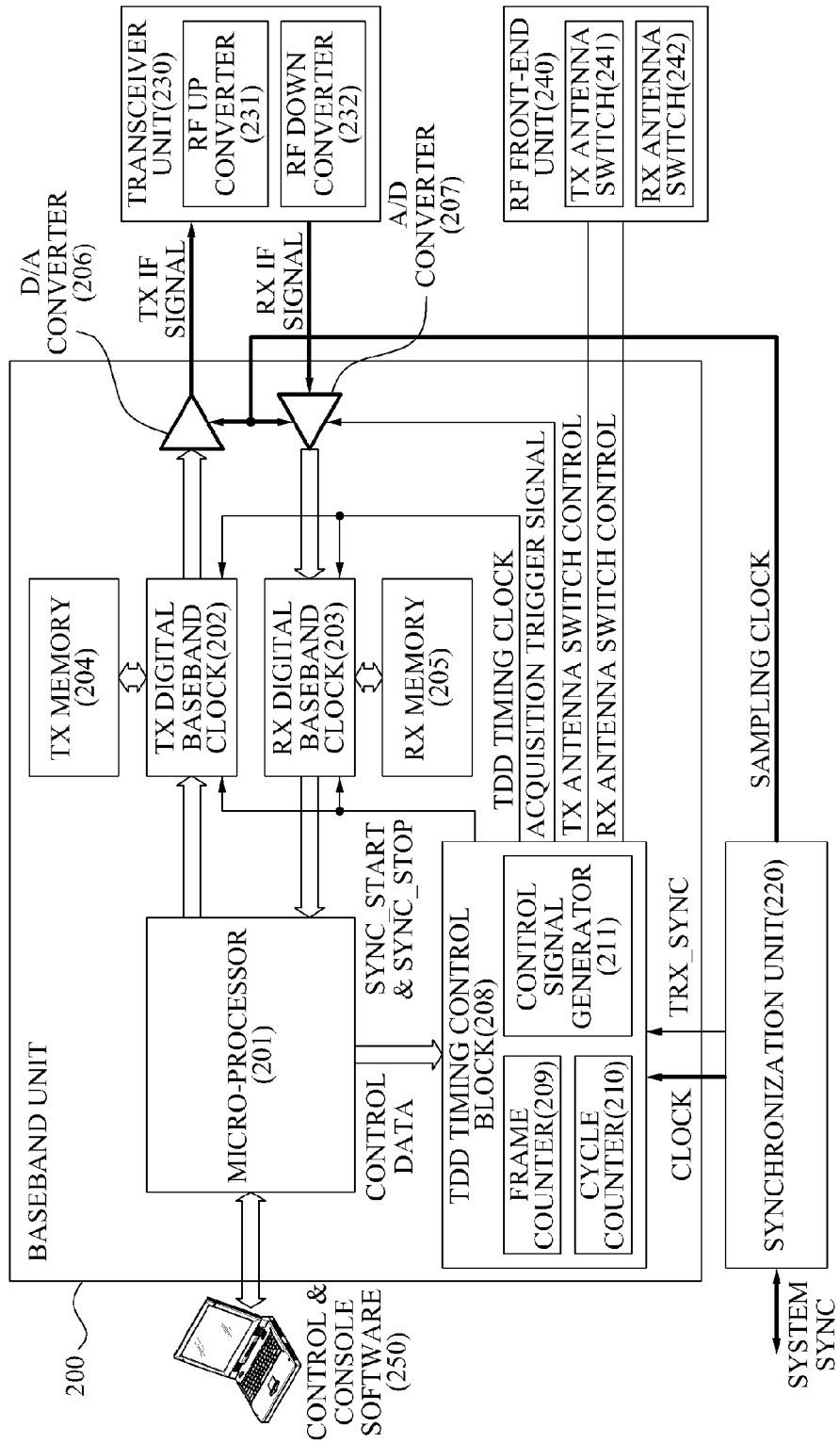
FIG. 2 is a block diagram illustrating a configuration of an apparatus for measuring a two-way radio channel using a Time Division Duplex (TDD) scheme in a multi-antenna radio channel measurement system according to an embodiment of the present invention.

The multi-antenna radio channel measurement system is described in detail with reference to FIG. 2. FIG. 2 is a block diagram illustrating a configuration of an apparatus for measuring a two-way radio channel using a Time Division Duplex (TDD) scheme in a multi-antenna radio channel measurement system according to an embodiment of the present invention.

Referring to FIG. 2, the multi-antenna radio channel measurement system includes a baseband unit 200, synchronization unit 220, transceiver unit 230, radio frequency (RF) front-end unit 240, and control & console software 250.

The baseband unit 200 transmits a probing signal for measurement, and receives and stores a received channel signal to be measured. The baseband unit 200 includes a micro-processor 201, transmission (Tx) digital baseband block 202, receiving (Rx) digital baseband block 203, Tx memory 204, Rx memory 205, digital to analog (D/A) converter 206, analog to digital (A/D) converter 207, and TDD timing control block 208.

The micro-processor 201 is connected to the control & console software 250 through Ethernet, and controls an operation of the radio channel measurement system according to a given command. Also, the micro-processor 201 transmits digital probing data for channel measurement to the Tx digital baseband block 202, and transmits channel measurement data, received in the Rx digital baseband block 203, to the control & console software 250. The Tx digital baseband unit 202 stores the digital probing data for channel measurement, received from the micro-processor 201, in the Tx memory 204. The Tx digital baseband unit 202 transmits the digital probing data for channel measurement to the D/A converter 206. The digital probing data for channel measurement is generated by the Tx digital baseband unit 202 based on a timing signal. The timing signal is provided by the TDD timing control block 208 and is suitable for a TDD mode. The D/A converter 206 converts a digital signal for transmission into an analog intermediate frequency (IF) signal for transmission, and transmits the analog IF signal to the transceiver unit 230. When receiving a channel, an input IF signal transmitted from the transceiver unit 230 is transmitted to the A/D converter 207. The A/D converter 207 converts an analog signal into digital data by sampling according to a sampling clock provided by the synchronization unit 220. The converted digital data is collected by the Rx digital baseband block 203, and the collected data is stored in the Rx memory 205.

The TDD timing control block 208 generates a timing control signal suitable for reception timing and transmission timing in a TDD mode based on synchronization signal of the synchronization unit 220 and synchronization parameter. The synchronization signal and synchronization parameter suitable for the TDD mode are provided from the micro-processor 201. Also, the TDD timing control block 208 provides the generated timing control signal to the baseband unit 200 and RF front-end unit 240. The TDD timing control block 208 includes a frame counter 209, cycle counter 210, and control signal generator 211.

The micro-processor 201 transmits a TDD synchronization parameter, and the like, to the TDD timing control block 208 to enable the radio channel measurement system to be appropriately operated in the TDD mode, before starting to measure a radio channel in the TDD mode. The TDD synchronization parameter includes a measurement bandwidth, length of Pseudo Noise (PN) chip, a number of transmission antennas, a number of receiving antennas, an iteration number of Rx codes, a number of frames, a number of cycles, and acquisition off time. The frame counter 209 and cycle counter 210 analyze the provided TDD synchronization parameter, count the number of frames, the number of cycles, and acquisition off time, and transmit the number of frames, the number of cycles, and acquisition off time to the control signal generator 211. The control signal generator 211 generates a variety of control signals such as a SYNC_START, SYNC_STOP, TDD timing clock, acquisition trigger signal, Tx/Rx antenna switch control signal, and the like, to enable the TDD mode to be available. The control signal generator 211 provides the generated control signals to the baseband unit 200 and RF front-end unit 240. The Tx/Rx antenna switch control signal depending on the number of frames and the number of cycles is described below with reference to FIG. 3. The SYNC_START, SYNC_STOP, TDD timing clock, and acquisition trigger signal are described in detail with reference to FIGS. 4 and 5.

The synchronization unit 220 is designed to obtain time synchronization with a synchronization unit of another radio channel measurement system, that is, another channel sounder. The synchronization unit 220 may obtain system synchronization with the synchronization unit of the other radio channel measurement system which is designed to be the same using a system synchronization signal. The synchronization unit 220 generates a TRX_Sync signal which is a transmission/reception synchronization signal using the obtained system synchronization signal, and transmits the TRX_Sync signal to the TDD timing control block 208. Also, the synchronization unit 210 provides a sampling clock and clocks required for an operation of the baseband unit 200.

The transceiver unit 230 includes an RF up-converter 231 and RF down-converter 232. The RF up-converter 231 up converts a transmission IF signal into a transmission RF band. The RF down-converter 232 down converts a signal of reception RF into a reception IF. The RF front-end unit 240 includes a Tx antenna switch 241 and Rx antenna switch 242. The RF front-end unit 240 switches an antenna suitable for the TDD mode based on the Tx antennal switch control signal and Rx antenna switch control signal generated by the TDD timing control block 208.

Figure 3:
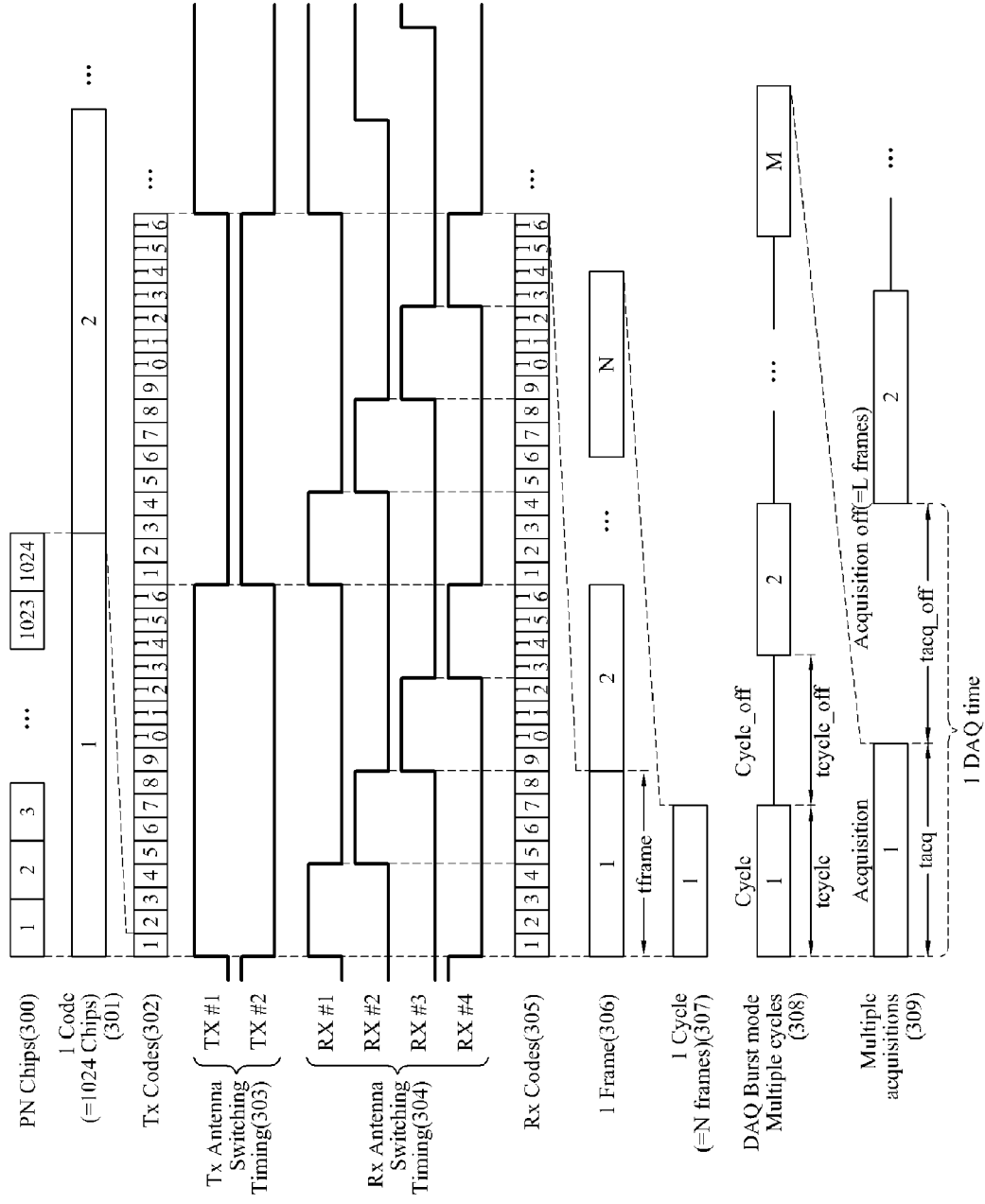
FIG. 3 is a diagram illustrating timings of parameters and probing signal used in a multi-antenna radio channel measurement system according to an embodiment of the present invention.

FIG. 3 is a diagram illustrating timings of parameters and signals used in a multi-antenna radio channel measurement system according to an embodiment of the present invention. A concept of TDD synchronization parameters transmitted to a TDD timing control block 208 by a micro-processor 201 is illustrated in FIG. 3. The TDD synchronization parameters include a measurement bandwidth, length of PN chip, a number of transmission antennas, a number of receiving antennas, an iteration number of Rx codes, a number of frames, a number of cycles, and acquisition off time. In FIG. 3, the TDD synchronization parameters, Tx antenna switching signal, Rx antenna switching signal, and a relationship of timing signals in a Data Acquisition (DAQ) mode are illustrated.

In FIG. 3, it is assumed that a length of a PN chip of the TDD synchronization parameters is 1024. The PN chips 300 are digital sequence data of a probing signal for measurement. The probing signal for measurement is generally used in a multi-antenna radio channel measurement system. A single code 301 is a basic unit of the probing signal for measurement used in the radio channel measurement, and the length of the code 301 is a length of the 1024 chips. Tx codes 302 transmitted for measurement may be in a configuration where the basic code 301 is continuously and repeatedly transmitted.

Hereinafter, it is assumed as an example that the measurement bandwidth is 100 MHz, the number of Tx antennas is two, the number of Rx antennas is four, the iteration number of Rx codes is four, the number of frames is N, the number of cycles is M, and acquisition off times is L.

When the number of Tx antennas is two and the number of Rx antennas is four, a switching timing of each antenna is shown as a Tx antenna switching timing 303 and Rx antenna switching timing 304 in FIG. 3. In FIG. 3, switching of Rx antenna is sequentially performed from an Rx antenna #1 to an Rx antenna #4. A time until a switching timing of every Rx antenna is performed once is identical to a time when switching timing of a Tx antenna #1 is performed. Then, switching timing of every Rx antenna is again performed once while switching timing of a Tx antenna #2 is performed. In this instance, a length of switching time of an Rx antenna is determined by the iteration number of Rx codes. When the iteration number of Rx codes is four, the length of the switching time is four times longer than a length of the single code 301. When the measurement bandwidth is 100 MHz, the Rx antenna switching time and Tx antenna switching time are given by, $$(\text{Time of 1 code}) = (\text{length of } PN \text{ chips}) \times (1/\text{Bandwidth}) = 1024 \times 10 \text{ ns} = 10.24 \text{ us}$$

$$(Rx \text{ Antenna Switching time}) = (\text{time of 1 code}) \times (\text{Iteration count of } Rx \text{ code}) = 10.24 \text{ us} \times 4 = 40.96 \text{ us}$$

$$(Tx \text{ Antenna Switching time}) = (\text{number of } Rx \text{ Antenna}) \times (Rx \text{ Antenna Switching time}) = 4 \times 40.96 \text{ us} = 163.84 \text{ us} \quad [\text{Equation 1}]$$

In FIG. 3, Rx codes 305 illustrates an amount of basic receiving data which may be received in the radio channel measurement system, when all of the Tx antennas and Rx antennas are alternately switched. The Rx codes 305 actually received includes a single frame 306. A time (tframe) of the received single frame is given by, $$t\text{frame} = (\text{number of } Tx \text{ Antenna}) \times (Tx \text{ Antenna Switching time}) = 2 \times 163.84 \text{ us} = 327.68 \quad [\text{Equation 2}]$$

When the number of frames as the TDD synchronization parameter is N, the N frames include a single cycle 307. When the N is ten, a time (tcycle) is given by, $$t\text{cycle} = (\text{number of frame}(=10)) \times t\text{frame} = 3.2768 \text{ ms} \quad [\text{Equation 3}]$$

Multiple cycles 308 and multiple acquisitions 309 illustrate timing when a DAQ mode receiving data in a multi-antenna radio channel system is a burst mode. In the burst mode, the number of cycles is at least one. Specifically, in the burst mode, when measuring a channel, measurement data is continuously and repeatedly acquired and data is stored all at once. Multiple cycles 308 when the number of cycles as the TDD synchronization parameter is M in the DAQ burst mode are illustrated in FIG. 3. In this instance, a cycle is repeated an M number of times, data is not received for a Cycle off time. Here, the single cycle time (tcycle) and Cycle off time (tcycle_off) are identical. A cycle of Cycle and Cycle off, repeated the M number of times in the multiple cycles 308, is the same as an acquisition time. When M is ten, the acquisition time (tacq) is represented as, $$tacq = (t\text{cycle} \times (\text{number of cycle}(M))) + (t\text{cycle\_off} \times ((\text{number of cycle}(M)) - 1)) = (3.2768 \text{ ms} \times 10) + (3.2768 \text{ ms} \times 9) = 62.2592 \text{ us} \quad [\text{Equation 4}]$$

In multiple acquisitions 309 of FIG. 3, acquisition and acquisition off are repeated a number of times. In the multiple acquisitions 309 of FIG. 3, a repeated operation where a baseband unit 203 is transmitted to a control & console software 250 through a micro-processor 201 for an acquisition off time (tacq_off) after receiving data for the acquisition time and temporarily storing the data in an Rx memory 205 is illustrated. The acquisition off time is provided as the TDD synchronization parameter, and is a positive number times than a frame. When the acquisition off time is L, a length of the acquisition off time is L×tframe.

Figure 4:
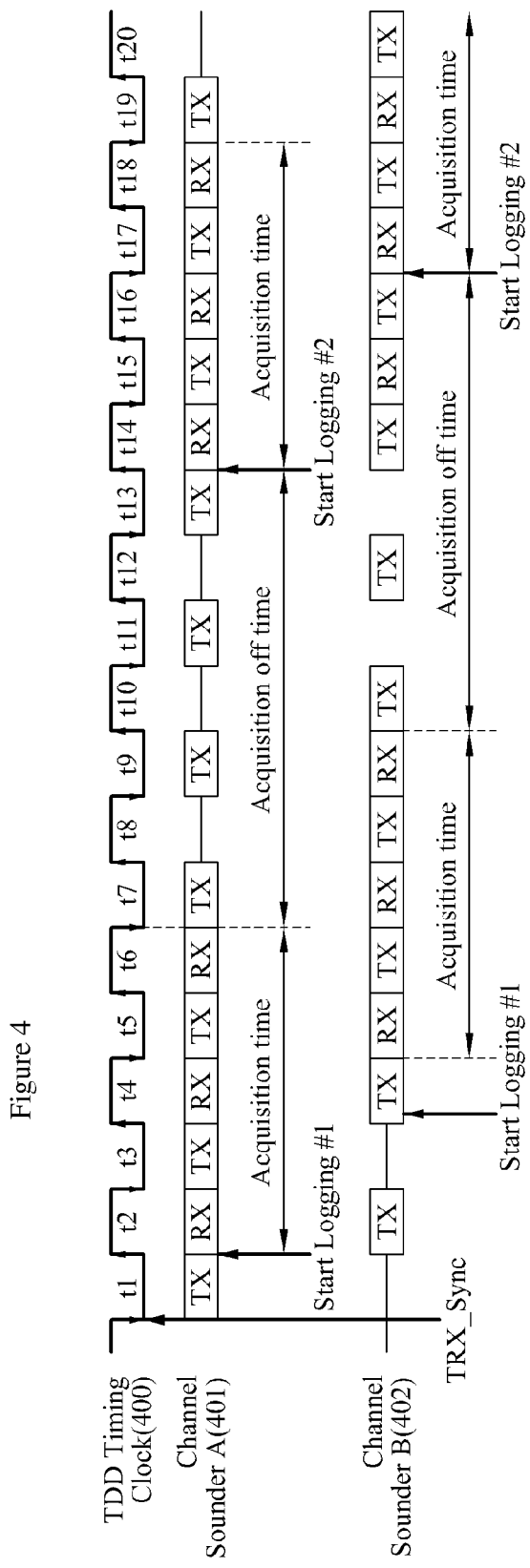
FIGS. 4 and 5 are diagrams illustrating timings when TDD timing signals are inappropriately generated in a TDD mode of a multi-antenna radio channel measurement system according to an embodiment of the present invention.
Figure 5:
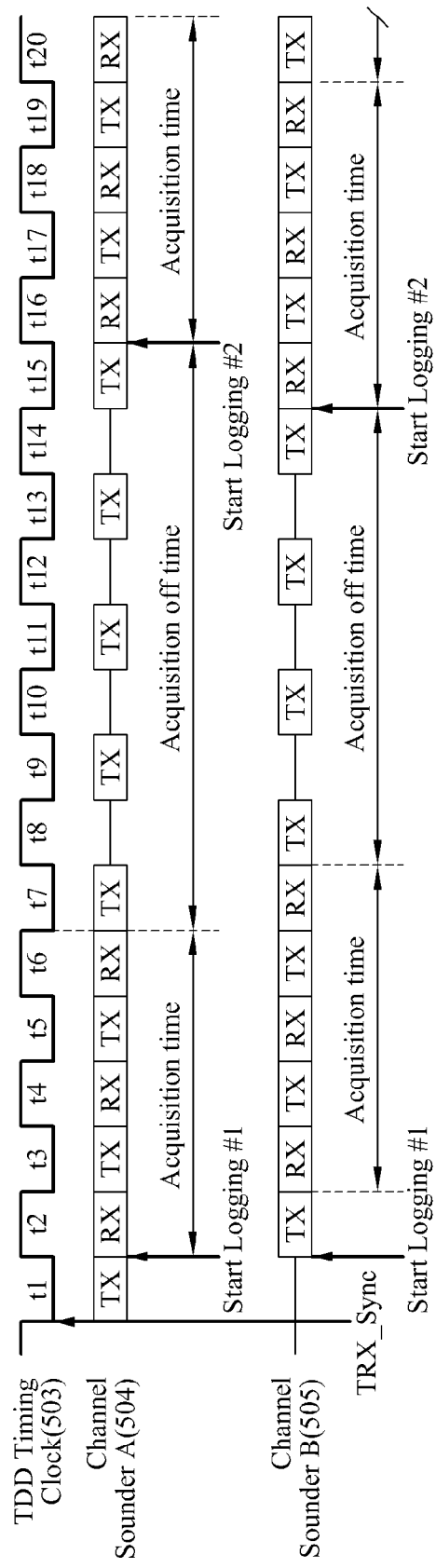

FIGS. 4 and 5 are diagrams illustrating timings when TDD timing signals are inappropriately generated in a TDD mode of a multi-antenna radio channel measurement system according to an embodiment of the present invention.

FIG. 4 illustrates an example of inappropriate TDD timing signal generation. A TDD timing clock 400 is a timing signal generated in a TDD timing control block 208. Specifically, the TDD timing clock 400 is a timing reference signal which is a standard when a channel sounder A 401 and channel sounder B 402 measure a two-way radio channel. The channel sounder A 401 and channel sounder B 402 are a multi-antenna radio channel measurement system according to the present invention. Each of the channel sounder A 401 and channel sounder B 402 generates a TDD timing clock, and a signal of each of the channel sounder A 401 and channel sounder B 402 is synchronized. The channel sounder A 401 is designed to perform a transmission operation in a low period of the TDD timing clock 400 and perform a receiving operation in a high period of the TDD timing clock 400. Conversely, the channel sounder B 402 is designed to perform the receiving operation in the low period of the TDD timing clock 400, and perform the transmission operation in the high period of the TDD timing clock 400. That is, measurement data transmitted by the channel sounder A 401 in the low period of the TDD timing clock 400 is received by the channel sounder B 402. Also, measurement data transmitted by the channel sounder B 402 in the high period is received by the channel sounder A 401. Synchronization of the TDD timing clock 400 which refers to a start of the transmission and receiving operation described above is achieved by a TRX_Sync signal. The TRX_Sync signal is generated in a synchronization unit 220 and transmitted to the TDD timing control block 208. That is, the channel sounder A 401 and channel sounder B 402 may set a transmission and receiving timing by the TDD timing clock 400 using the TRX_Sync signal. In this instance, when a Start Logging #1 of each of the channel sounder A 401 and channel sounder B 402 is not synchronized and different as illustrated in FIG. 4, data received for an acquisition time may not be considered as data simultaneously measured in a same measurement point, vehicle speed, and environment as described in FIG. 1. The Start Logging #1 is a point in time when starting receiving data of the channel sounder A 401 and channel sounder B 402. Accordingly, the Start Logging #1 of each of the channel sounder A 401 and channel sounder B 402 is to be synchronized. Thus, the TDD timing signals of FIG. 4 are inappropriately generated.

FIG. 5 illustrates an example when a Start Logging #1 is synchronized. A channel sounder A 504 and channel sounder B 505 start receiving based on a provided TDD synchronization parameter, and acquire measurement data for a first acquisition time. However, when an acquisition off time is different, a Start Logging #2 may not be synchronized. The Start Logging #2 is a start point in a subsequent acquisition time. A micro-processor 201 transmits received data stored in an Rx memory 205 to a control & console software 250 and stores for the acquisition off time. Since a performance of each control & console software 250 installed at a laptop computer of channel sounder A 504 and channel sounder B 505 is different, the acquisition off time may be different. Accordingly, in a method of generating TDD timing signals in FIG. 5, although the Start Logging #1 may be synchronized, the Start Logging #2 may not be synchronized.

Accordingly, data may not be considered as data simultaneously measured at a same measurement point, vehicle speed, and environment as described in FIG. 1. Thus, according to the present invention, timing in FIG. 6 is provided to overcome the disadvantage described above.

Figure 6:
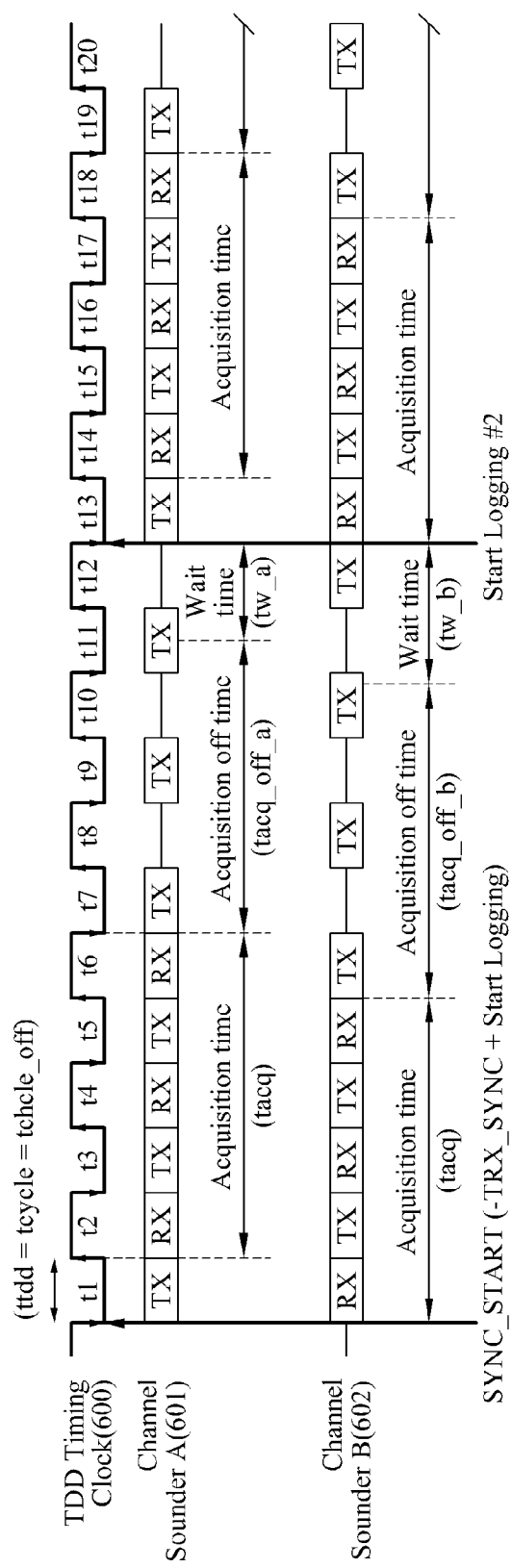
FIG. 6 is a diagram illustrating timings of TDD timing signals in a multi-antenna radio channel measurement system according to an embodiment of the present invention.

FIG. 6 is a diagram illustrating timings of TDD timing signals in a multi-antenna radio channel measurement system according to an embodiment of the present invention.

The timings of TDD timing signals are designed to supplement a method of generating a TDD timing signal of FIGS. 4 and 5. A TDD timing clock 600 is designed to be generated by TDD synchronization parameters described in FIG. 3. That is, a time (tcycle) of a cycle and a cycle off time (tcycle_off) of provided TDD synchronization parameters are designed to be a half cycle period (ttdd) of the TDD timing clock 600. A channel sounder A 601 and channel sounder B 602 may generate the same TDD timing clock 600. According to an embodiment of the present invention, a cycle of the TDD timing clock 600 may be arbitrarily set based on the provided TDD synchronization parameters. The cycle may be flexibly operated from about 960 ns to infinity in a minimum condition represented as, Minimum condition: (length of *PN* chips)=32, (Bandwidth)=100 MHz, (number of *TX* Antenna)=1, (number of *Rx* Antenna)=1, (Iteration count of *Rx* code)=3

$$ttdd(=tframe=tcycle=tcycle\_off)=(\text{length of } PN \text{ chips}) \times (1/\text{Bandwidth}) \times (\text{number of } TX \text{ Antenna}) \times (\text{number of } Rx \text{ Antenna}) \times (\text{Iteration count of } Rx \text{ code})=960 \text{ ns} \quad [\text{Equation 5}]$$

Also, a start point of transmission and receiving of the channel sounder A 601 and channel sounder B 602 is set as a SYNC_START signal. The SYNC_START signal is set by summing a TRX_Sync signal and a Start Logging signal of FIGS. 4 and 5. That is, the start points of receiving data of the channel sounder A 601 and channel sounder B 602 may be prevented from being different from each other. Data received by the channel sounder A 601 and channel sounder B 602 may be data simultaneously measured at a same measurement point, vehicle speed, and environment as described in FIG. 1.

Also, when an acquisition off time (tacq_off) of the channel sounder A 601 is different from an acquisition off time (tacq_off_b) of the channel sounder B 602, to supplement a disadvantage of FIG. 5, a wait time (tw_a and tw_b) is provided to each of the channel sounder A 601 and channel sounder B 602 so that a Start Logging #2 of each of the channel sounder A 601 and channel sounder B 602 is synchronized again and data may be received. Accordingly, the channel sounder A 601 and channel sounder B 602 may simultaneously receive measurement data at the same measurement point, vehicle speed, and environment as described in FIG. 1.

Also, according to an embodiment of the present invention, when the multi-antenna radio channel measurement system performs a two-way radio channel measurement using a TDD scheme, a Transfer Time Interval (TTI) used in a general TDD-based wireless communication system, that is, a cycle of TDD timing clock, can be set at a fixed value. Accordingly, the wireless communication system based on the general TDD scheme may be simulated. And, when the TDD cycle of arbitrary wireless telecommunications system is predicted, the radio channel measurement can be performed in the same environment.

Hereinafter, a method of measuring a two-way radio channel which generates a TDD timing signal in the multi-antenna radio channel measurement system is described in detail with reference to FIG. 7.

Figure 7:
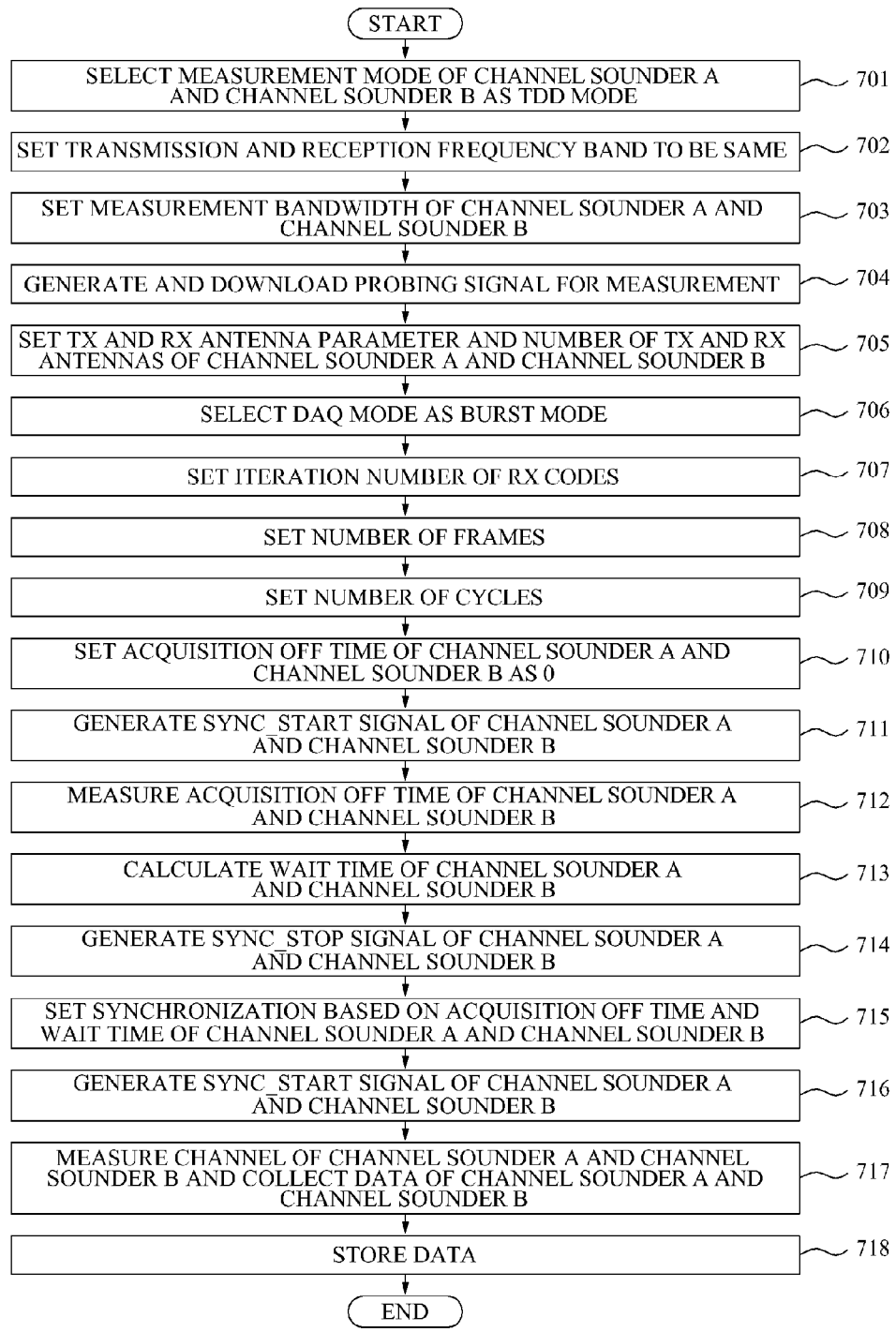
FIG. 7 is a flowchart illustrating operations of measuring a two-way radio channel using a TDD scheme in a multi-antenna radio channel measurement system according to an embodiment of the present invention.

FIG. 7 is a flowchart illustrating operations of measuring a two-way radio channel using a TDD scheme in a multi-antenna radio channel measurement system according to an embodiment of the present invention. By referring to FIG. 7, a measurement mode of a channel sounder A and channel sounder B is selected as a TDD mode based on a selection of a control & console software 250 in operation 701. The channel sounder A and channel sounder B are the same two-way radio channel measurement systems. In operation 702, a transmission and reception frequency band to be measured according to a control of the control & console software 250 is set identically. In operation 703, a measurement bandwidth of each of the channel sounder A and channel sounder B is set. In operation 704, a probing signal for measurement to be used in the control & console software 250 is generated, and downloaded and stored in a Tx memory 204. In operation 705, a Tx and Rx antenna parameter and a number of Tx and Rx antenna parameters are set based on a scenario to be used for measurement. In operation 706, a DAQ mode for receiving data is selected as a burst mode. In operation 707, an iteration number of Rx codes is set. In operation 708, a number of frames is set. In operation 709, a number of cycles is set. The iteration number of Rx codes, the number of frames, and the number of cycles are TDD synchronization parameters. During operation 707 through operation 709, an acquisition time of each of the channel sounder A and channel sounder B is determined.

In operation 710, an acquisition off time of each of the channel sounder A and channel sounder B is set as 0. In operation 711, a synchronization and a reception start signal (SYNC_START) of each of the channel sounder A and channel sounder B is generated. In operation 712, the acquisition off time of each of the channel sounder A and channel sounder B is measured. In operation 713, a wait time of each of the channel sounder A and channel sounder B is calculated. In operation 714, a SYNC_STOP signal of the channel sounder A and channel sounder B is generated to stop the synchronization and receiving.

In operation 715, the synchronization is set based on the measured acquisition off time and wait time of each of the channel sounder A and channel sounder B. In operation 716, the SYNC_START signal of each of the channel sounder A and channel sounder B is simultaneously generated. In operation 717, a channel of each of the channel sounder A and channel sounder B is measured, and data of each of the channel sounder A and channel sounder B is acquired. In operation 718, the two-way radio channel measurement is performed based on a predetermined measurement path and data is stored. Then, an algorithm according to the present invention is finished.

According to the present invention, the multi-antenna radio channel measurement system and method improves the reliability and correlation about measurement data, simultaneously measures an uplink radio channel and downlink radio channel, and thereby may reduce a time, cost, and human resources required for measurement.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A multi-antenna radio channel measurement system which measures a probing signal for measuring a radio channel, the multi-antenna radio channel measurement system comprising:

a baseband unit which synchronizes with another radio channel measurement system based on a Time Division Duplex (TDD) synchronization time, and alternately transmits the probing signal for measurement and receives a received channel signal to be measured;

a synchronization unit which obtains time synchronization with the other radio channel measurement system, generates a transmission/reception synchronization signal, and provides the transmission/reception synchronization signal to the baseband unit;

a transceiver unit which up converts the probing signal for measurement and down converts the received channel signal; and a radio frequency (RF) front-end unit which switches suitable antennas according to a timing control signal of the baseband unit, and wherein the baseband unit comprises:

a timing control block which generates a transmission timing control signal suitable for transmission timing in a TDD mode based on a predetermined synchronization parameter and the transmission/reception synchronization signal of the synchronization unit;

a transmission memory which stores the signal for measurement;

a transmission digital baseband block which downloads the probing signal for measurement, stores the probing signal for measurement in the transmission memory, and outputs the probing signal for measurement according to the transmission timing control signal; and a micro-processor which controls the predetermined synchronization parameter to be received from a control and console software and to be provided to the timing control block, controls the probing signal for measurement to be received from the control and console software and to be transmitted to the transmission digital baseband block, and controls the probing signal for measurement to be transmitted through the transmission digital baseband block according to the transmission timing control signal generated in the timing control block.

2. The multi-antenna radio channel measurement system of claim 1, wherein the predetermined synchronization parameter includes a length of the probing signal for measurement, a number of transmission antennas, a number of receiving antennas, an iteration number of receiving codes, a number of frames, and a number of cycles.

3. The multi-antenna radio channel measurement system of claim 1, wherein the timing control block comprises:

a frame counter which receives a number of frames from the micro-processor and counts the number of frames, the number of frames being a predetermined synchronization parameter;

a cycle counter which receives a number of cycles from the micro-processor and counts the number of cycles, the number of cycles being a predetermined synchronization parameter; and a control signal generator which generates a timing control signal which TDD-synchronizes with the other radio channel measurement system according to the results of the frame counter and cycle counter.

4. The multi-antenna radio channel measurement system of claim 3, wherein the control signal generator confirms an acquisition off-time of the multi-antenna radio channel measurement system, sets a wait time to synchronize with the other radio channel measurement system, and generates the timing control signal based on the acquisition off time and wait time to synchronize with the other radio channel measurement system.

5. A multi-antenna radio channel measurement system which measures a probing signal for measuring a radio channel, the multi-antenna radio channel measurement system comprising:
- a baseband unit which synchronizes with another radio channel measurement system based on a Time Division Duplex (TDD) synchronization time, and alternately transmits the probing signal for measurement and receives a received channel signal to be measured;
- a synchronization unit which obtains time synchronization with the other radio channel measurement system, generates a transmission/reception synchronization signal, and provides the transmission/reception synchronization signal to the baseband unit;
- a transceiver unit which up converts the probing signal for measurement and down converts the received channel signal; and
- a radio frequency (RF) front-end unit which switches suitable antennas according to a timing control signal of the baseband unit, and
wherein the baseband unit comprises:
- a timing control block which generates a reception timing control signal suitable for reception timing in a TDD mode based on a predetermined synchronization parameter and the transmission/reception synchronization signal of the synchronization unit;
- a receiving memory which stores the received channel signal;
- a receiving digital baseband block which receives the received channel signal according to the reception timing control signal of the timing control block, and stores the received channel signal in the receiving memory; and
- a micro-processor which controls the received channel signal to be received through the receiving digital baseband block according to the reception timing control signal generated in the timing control block.

6. The multi-antenna radio channel measurement system of claim 5, wherein the predetermined synchronization parameter includes a length of the probing signal for measurement, a number of transmission antennas, a number of receiving antennas, an iteration number of receiving codes, a number of frames, and a number of cycles.

7. A method of measuring a radio channel in a multi-antenna radio channel measurement system, the method comprising:
- setting a frequency band and bandwidth to be measured in a TDD mode;
- downloading and storing a predetermined probing signal for measurement;
- receiving and setting a predetermined synchronization parameter;
- setting a transmission and reception timing control signal to synchronize with another radio channel measurement system for a bidirectional measurement; and
- transmitting the probing signal for measurement according to the timing control signal, and receiving and storing a received channel signal.

8. The method of claim 7, wherein the predetermined synchronization parameter includes a length of the probing signal for measurement, a number of transmission antennas, a number of receiving antennas, an iteration number of receiving codes, a number of frames, and a number of cycles.

9. The method of claim 7, wherein the setting of the transmission and reception timing control signal comprises:
- confirming an acquisition off time and setting a wait time to synchronize with the other radio channel measurement system; and
- setting the transmission and reception timing control signal based on the acquisition off time and wait time.

* * * * *